(12) United States Patent
Klassen et al.

(10) Patent No.: US 11,791,682 B2
(45) Date of Patent: *Oct. 17, 2023

(54) RADIAL MULTI PIECE ROTOR FOR ELECTRIC MACHINE

(71) Applicant: GENESIS MOTION SOLUTIONS ULC, Vancouver (CA)

(72) Inventors: James Klassen, Osoyoos (CA); Damian Spasov, Port Moody (CA); Bradley Pope, Maple Ridge (CA); Jason Kum, Langley (CA)

(73) Assignee: GENESIS MOTION SOLUTIONS ULC, Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/985,152

(22) Filed: Nov. 11, 2022

(65) Prior Publication Data

US 2023/0072406 A1   Mar. 9, 2023

Related U.S. Application Data

(63) Continuation of application No. 16/649,048, filed as application No. PCT/IB2018/057373 on Sep. 24, 2018, now Pat. No. 11,527,931.

(Continued)

(51) Int. Cl.
*H02K 1/27* (2022.01)
*H02K 1/30* (2006.01)
*H02K 1/274* (2022.01)
*H02K 15/03* (2006.01)
*H02K 1/2791* (2022.01)

(52) U.S. Cl.
CPC ............... *H02K 1/30* (2013.01); *H02K 1/274* (2013.01); *H02K 1/2791* (2022.01); *H02K 15/03* (2013.01)

(58) Field of Classification Search
CPC .......... H02K 1/30; H02K 1/274; H02K 15/03; H02K 1/2773; H02K 1/2786; H02K 1/18
See application file for complete search history.

(56) References Cited

U.S. PATENT DOCUMENTS 5,091,668 A   2/1992 Cuenot et al.
6,288,467 B1   9/2001 Lange
(Continued)

FOREIGN PATENT DOCUMENTS

CN   101438486 A   5/2009
CN   101978578 A   2/2011
(Continued)

OTHER PUBLICATIONS

Extended European Search Report received for EP Application No. 18859246.3, dated May 7, 2021, 15 pages.
(Continued)

*Primary Examiner* — Thomas Truong (57) ABSTRACT

A permanent magnet carrier, which could be a rotor or stator of an electric machine, includes a first non-magnetic ring and a second non-magnetic ring. Between the rings are soft magnetic pole elements. The soft magnetic pole elements each connect to the first and second non-magnetic rings and the soft magnetic pole elements are separated from each other by the first and second non-magnetic rings. Permanent magnets are disposed between the soft magnetic pole elements.

12 Claims, 11 Drawing Sheets

Related U.S. Application Data (60) Provisional application No. 62/562,486, filed on Sep. 24, 2017.

(56) References Cited

U.S. PATENT DOCUMENTS

| | | | |
|---|---|---|---|
| 6,734,596 | B1 | 5/2004 | Liao |
| 11,527,931 | B2 * | 12/2022 | Klassen ................. H02K 15/03 |
| 2006/0061227 | A1 * | 3/2006 | Heideman ............ H02K 1/2773 |
| | | | 310/156.47 |
| 2008/0093945 | A1 | 4/2008 | Gruenhagen |
| 2009/0309448 | A1 | 12/2009 | Yang |
| 2013/0187486 | A1 | 7/2013 | Lee et al. |
| 2013/0328432 | A1 | 12/2013 | Hoemann |
| 2015/0061441 | A1 | 3/2015 | Figgins et al. |
| 2016/0065011 | A1 | 3/2016 | Schneider et al. |

FOREIGN PATENT DOCUMENTS

| | | |
|---|---|---|
| CN | 102792560 A | 11/2012 |
| CN | 103178631 A | 6/2013 |
| CN | 103219812 A | 7/2013 |
| DE | 102015112862 A1 | 2/2016 |
| EP | 2677631 A2 | 12/2013 |
| EP | 3022830 B1 | 5/2017 |
| GB | 2159342 A | 11/1985 |
| JP | H05227685 A | 9/1993 |
| JP | H06153427 A | 5/1994 |
| JP | 2003134705 A | 5/2003 |
| JP | 2010057233 A | 3/2010 |
| JP | 2013121284 A | 6/2013 |
| JP | 2013123365 A | 6/2013 |
| JP | 2016163468 A | 9/2016 |
| TW | M312835 U | 5/2007 |
| WO | 2011076740 A1 | 6/2011 |
| WO | 2013100668 A1 | 7/2013 |
| WO | 2014082839 A2 | 6/2014 |

OTHER PUBLICATIONS

International Preliminary Report on Patentability received for PCT patent Application No. PCT/IB2018/057373, dated Apr. 2, 2020, 6 pages.

International Search Report and Written Opinion received for PCT patent Application No. PCT/IB2018/057373, dated Jan. 22, 2019, 7 pages.

Office Action received for CN Application No. 201880061399.0, dated Jan. 6, 2022, 15 Pages (07 Pages of English Translation and 08 Pages of Official notification).

Office Action received for CN Application No. 201880061399.0, dated Jul. 11, 2022, 18 Pages (09 Pages of English Translation and 09 Pages of Official notification).

Office Action received for JP Application No. 2020-514498, dated Aug. 24, 2022, 07 Pages (04 Pages of English translations and 03 Pages of Official notification).

* cited by examiner

RADIAL MULTI PIECE ROTOR FOR ELECTRIC MACHINE

CROSS-REFERENCE TO RELATED APPLICATIONS

This application is a continuation of U.S. patent application Ser. No. 16/649,048 filed on Mar. 19, 2020, which in turn claims benefit from filing under 35 U.S.C. 371 as the National Phase of International Patent Application No. PCT/IB2018/057373, filed on Sep. 24, 2018, which claims the benefit of and priority to U.S. Provisional Application No. 62/562,486, filed on Sep. 24, 2017, both of which are incorporated herein by reference in their entireties.

FIELD

Electric machines.

BACKGROUND

Electric machines include a stator and rotor driven in relation to the stator by energization of poles in the stator that interact with poles of the rotor. In a rotor with flux opposing poles, it is advantageous for power and efficiency to reduce the flux leakage between adjacent poles.

SUMMARY

There is disclosed a new and unobvious way of reducing flux leakage in an electric machine, as well as a new construction of a rotor or stator of an electric machine, and a method of manufacture of the rotor or stator. By creating the poles of a soft magnetic material with no soft magnetic components connecting between adjacent poles is an ideal construction, but this is very challenging to achieve because the permanent magnets are repelling each other so the components are always trying to push themselves apart during assembly. A solution to this problem is presented here where the rotor geometry is such that a rigid structure may be assembled and established before the insertion of the permanent magnets. This allows the rotor to act as the assembly fixture and dramatically simplifies the assembly process. Other advantages of the device include complete magnetic isolation of the steel posts and the opportunity for low cost manufacturing of the individual components.

In an embodiment, there is disclosed a permanent magnet carrier comprising a first non-magnetic ring, a second non-magnetic ring, soft magnetic pole elements, the soft magnetic pole elements each connecting to the first and second non-magnetic rings and the soft magnetic pole elements separated by the first and second non-magnetic rings; and permanent magnets disposed between the soft magnetic pole elements.

In a further embodiment, the first and second non-magnetic rings are axially separated rings. The magnetic pole elements may have shoe tips shaped to restrain the magnets from motion in a radial direction. The radial direction may be an outward radial direction and the permanent magnet carrier may further comprise a third non-magnetic ring connected to the first and second non-magnetic rings and positioned radially inward of the magnets. The third non-magnetic ring is a portion of a hub. The radial direction may be an inward radial direction and the permanent magnet carrier may further comprise a third non-magnetic ring connected to the first and second non-magnetic rings and positioned radially outward of the magnets. The soft magnetic pole elements may comprise bosses fitted in receiving slots in the first and second non-magnetic rings.

In an embodiment, there is disclosed a method of constructing a permanent magnet carrier, the method comprising providing an alignment ring defining slots for receiving soft magnetic pole elements, positioning soft magnetic pole elements in the slots defined by the alignment ring, contacting a first non-magnetic ring with the soft magnetic pole elements to connect the soft magnetic pole elements to the first non-magnetic ring, contacting a second non-magnetic ring with the soft magnetic pole elements opposite to the first non-magnetic ring to connect the soft magnetic pole elements to the second non-magnetic ring, removing the alignment ring; and inserting magnets between the soft magnetic pole elements. There may also be provided the step of connecting a third non-magnetic ring to the first and second non-magnetic rings.

In an example, a rotor with separate components for each soft magnetic pole, and non-magnetic end rings and magnets are inserted before an ID or OD ring is installed that contacts at least the end rings.

BRIEF DESCRIPTION OF THE FIGURES

Embodiments will now be described with reference to the figures, in which like reference characters denote like elements, by way of example, and in which.

DETAILED DESCRIPTION

Immaterial modifications may be made to the embodiments described here without departing from what is covered by the claims. In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

In embodiments of the device, a structure and assembly procedure is disclosed whereby soft magnetic poles are isolated from each other magnetically but connected to each other physically such that a rigid structure is created as if, for all relevant intents and purposes, the rotor was made of one piece of material. In this description, ID means inner diameter and OD means outer diameter.

Figure 1:
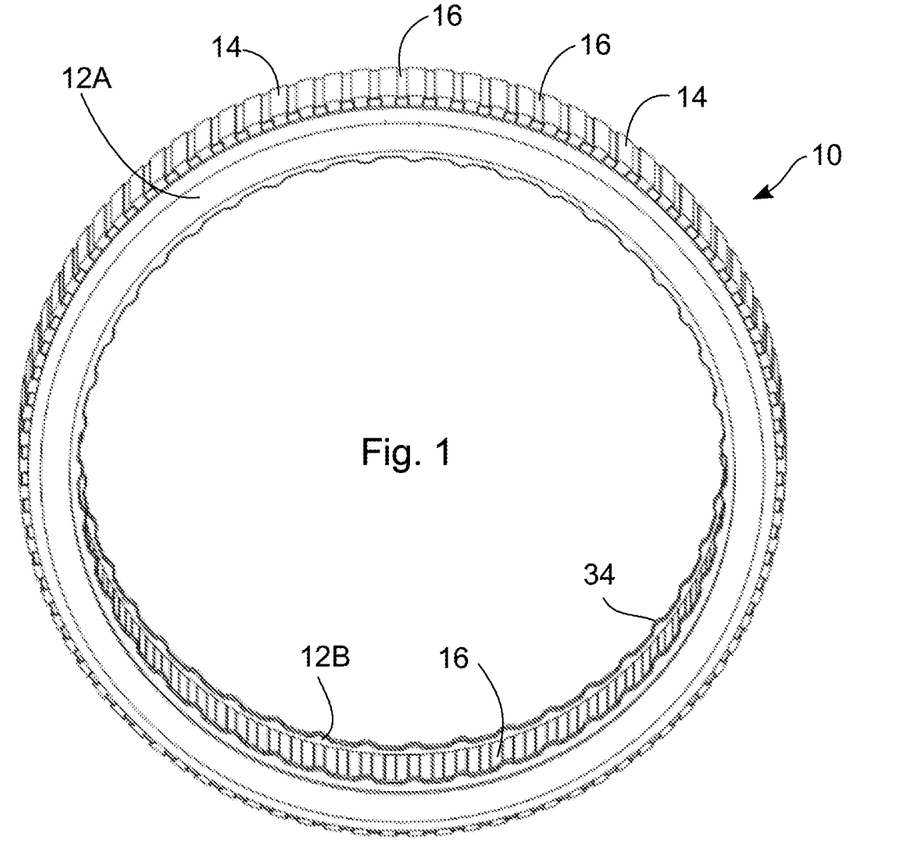
FIG. 1 shows an assembly of magnetic components for a carrier, for example a rotor of an electric machine.

Thus for example, a permanent magnet carrier 10, which could be a rotor or stator of an electric machine, is shown in FIG. 1 including a first non-magnetic ring 12A and a second non-magnetic ring 12B that are separated in the axial direction. Between the rings 12A and 12B are soft magnetic pole elements 14. The soft magnetic pole elements 14 each contact and connect to the first and second non-magnetic rings 12A and 12B and the soft magnetic pole elements 14 are separated from each other by the first and second non-magnetic rings 12A and 12B. Permanent magnets 16 are disposed between the soft magnetic pole elements 14.

Figure 8:
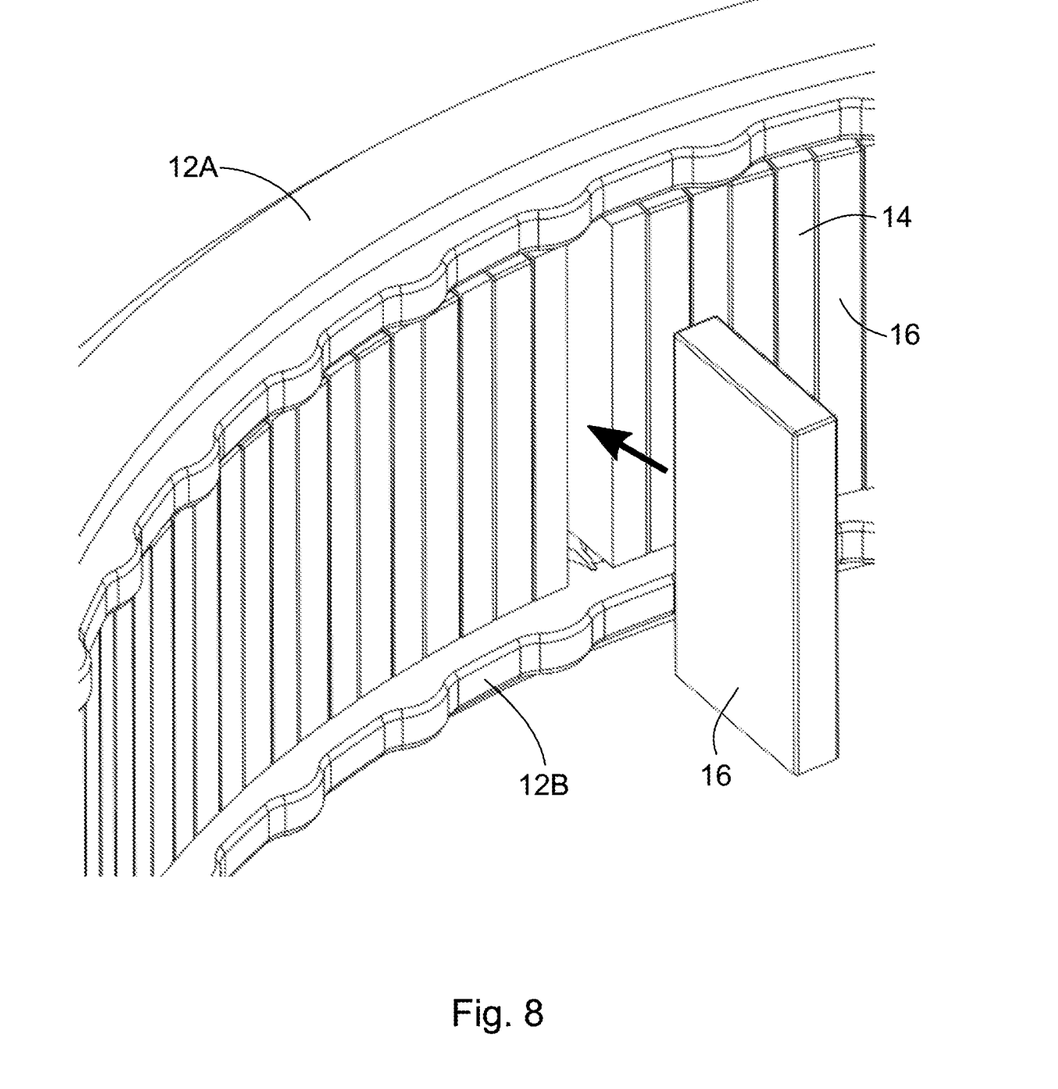
FIG. 8 shows magnet insertion between magnet carriers, mounted between magnet carrier rings.
Figure 9:
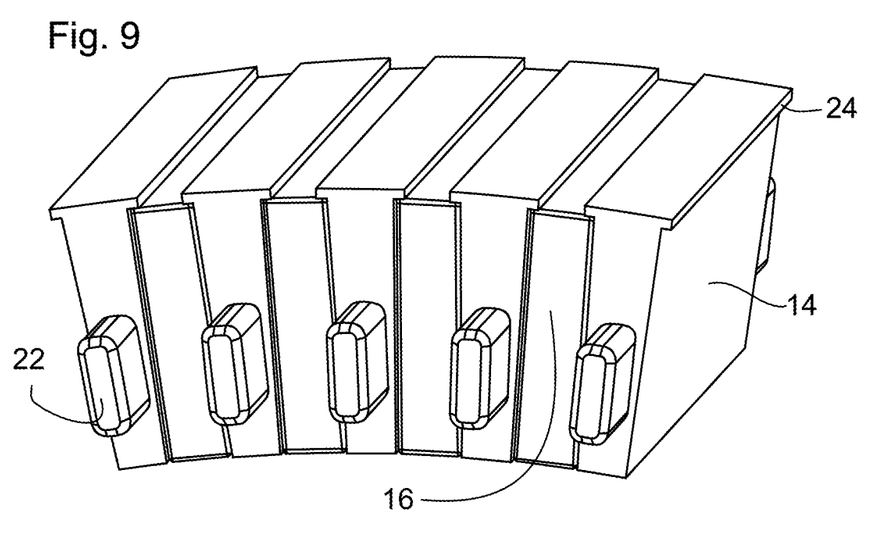
FIG. 9 shows magnets radially restrained by magnet carrier insert.

This assembly is made possible by creating an assembly of soft magnetic poles 14 and non-magnetic end rings 12A and 12B before the permanent magnets 16 are inserted from the ID as shown for example in FIG. 8 (or OD in an internal rotor configuration). After that, an ID (or OD in an external rotor configuration) ring 18 is inserted (on the same ID or OD as the magnets were inserted). This third ring 18 (which may be a portion of a hub 36 in the exemplary embodiment as shown in FIG. 2) is preferably assembled with a thermal fit and serves to hold the whole assembly together as if, for all relevant intents and purposes, it were made from a solid piece of material, including restraining radial motion of the magnets.

Figure 2:
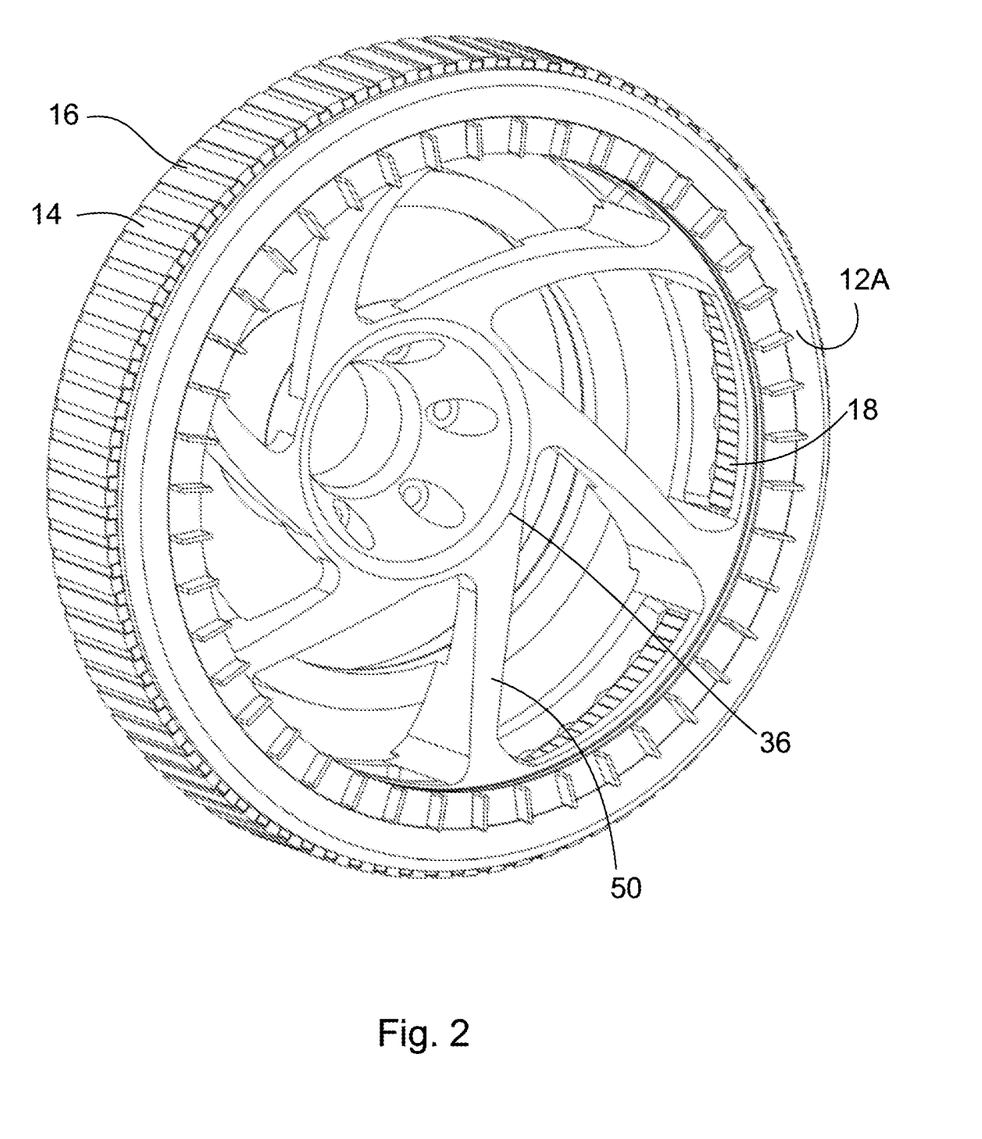
FIG. 2 shows magnets, magnet carrier inserts, carrier rings shown mounted on an exemplary rotor hub.
Figure 13:
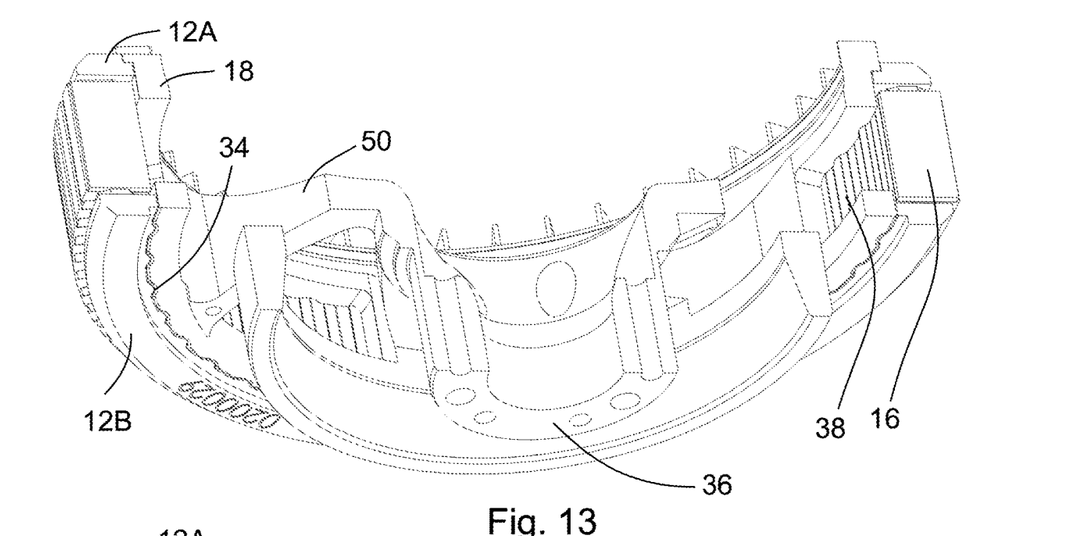
FIG. 13 is an isometric cutaway view of the assembly of FIG. 2 showing air channels.
Figure 14:
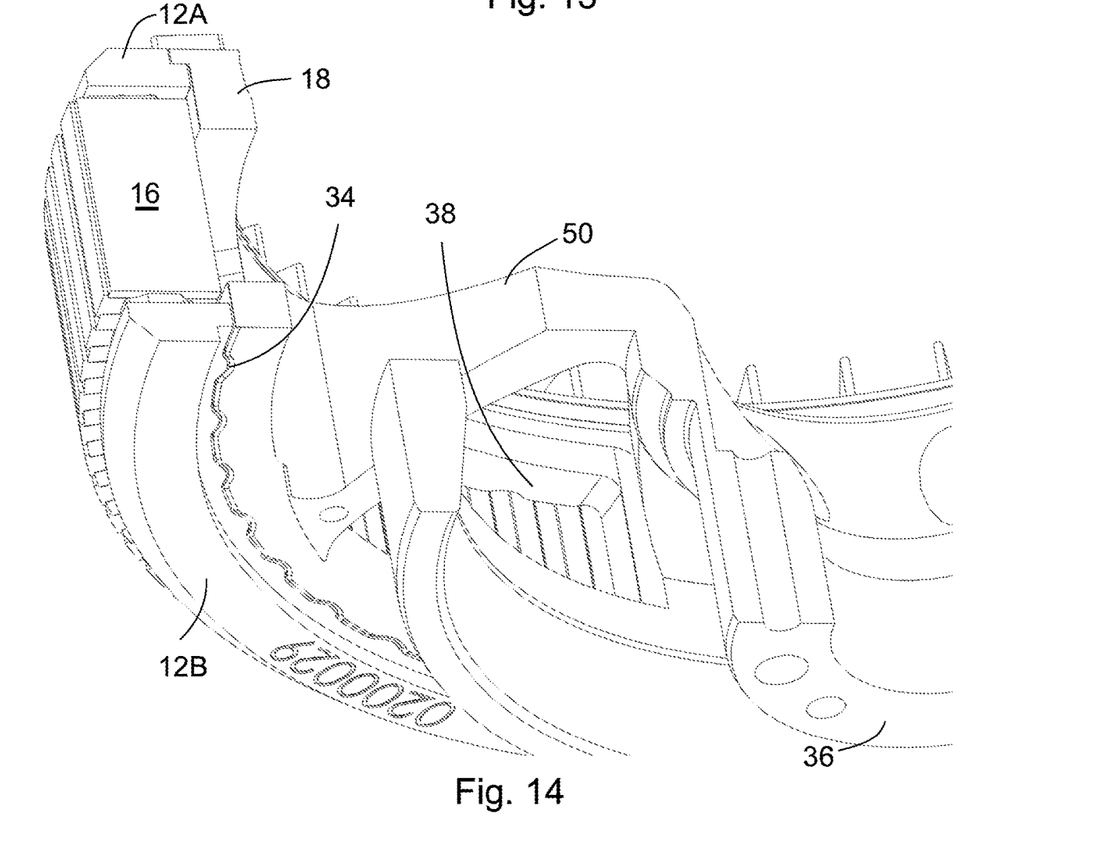
FIG. 14 is a closeup of the view of FIG. 2.

In the exemplary embodiment shown in FIG. 2, the third ring 18 contains windows 38 which allow airflow to the magnets. FIGS. 13 and 14 show cutaway views of the embodiment of FIG. 2 to better see the structure of the hub 36. In this embodiment air can flow radially around the ends of the magnets via gaps 48 shown in FIGS. 4, 6 and 12. Air can also in this embodiment flow circumferentially between the end rings 12A and 12B and the posts 14 and magnets 16 at radially inner portions of the end rings 12A and 12B. Airflow to the magnets through the windows 38 is induced in operation of the motor by the rotary movement of the rotor including curved arms 50.

Soft magnetic materials are those materials that are easily magnetised and demagnetised. They typically have intrinsic coercivity less than 1000 Am-1. Examples of soft magnetic material include iron, steel, ductile steel, and various iron and steel alloys.

In the exemplary rotor assembly, poles 14 are made of magnetic material and are detached from the core construction. This allows the pole-to-pole connecting structure to be made of highly magnetic flux resistant material, such as but not limited to titanium and aluminum, which results in reduction of pole-to-pole magnetic flux leakage, increase in magnetic flux in the air gap between stator and rotor, and increase torque and torque per current (Kt).

Figure 5:
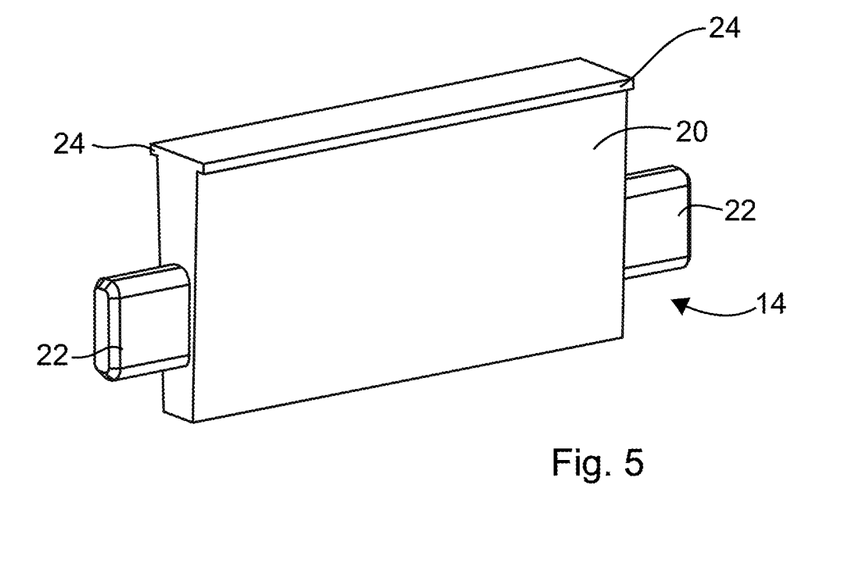
FIG. 5 shows a magnet carrier insert for use with permanent magnets.

In an example of the radial multi piece rotor assembly, multiple electromagnetic pole elements 14 are mechanically inserted onto non-electromagnetic pole carrier rings 12A and 12B. The electromagnetic poles 14 are made of a soft magnetic material such as, but not limited to, steel or iron. As shown in FIG. 5, each pole comprises a main pole body 20, high precision rectangular protruding bosses 22 at both ends for mating to pole carrier rings 12A and 12B, and extended shoe tips 24 to locate rectangular magnets 16 which sit in between poles 14 and restrain motion of the magnets 16 in a radial direction.

Figure 15:
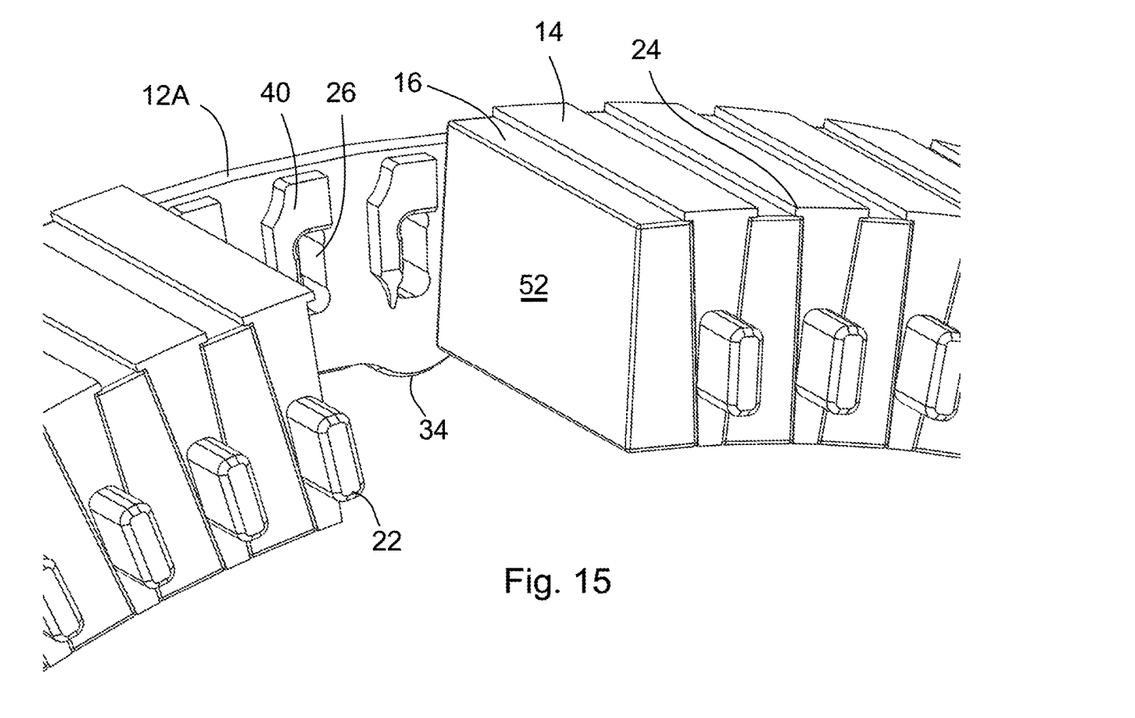
FIG. 15 is a closeup isometric cutaway view of a portion of an assembly including tapered magnets.

In the embodiment shown, the poles are tapered only to the degree that the walls of adjacent poles are parallel to define straight slots to receive the magnets. As an alternative or in addition to the straight slots and shoe tips 24, the poles may be shaped with an increased taper, or in a radially outer embodiment a reduced or inverted taper. This causes a taper of the slots between the poles to accommodate tapered magnets. Tapered slots have the advantage of reducing the width tolerance requirement for the magnets and also provides more torque for a given volume by maximizing the steel at the airgap and maximizing the magnet width at the thin end of the tapered steel poles. FIG. 15 is a closeup isometric cutaway view showing magnets 16, poles 14 and one pole carrier ring 12A. The magnets in the embodiment shown in FIG. 15 have tapered sides 52. Some magnets and poles are omitted to better show a tapered side 52 and the pole carrier ring 12A. In the embodiment shown, the poles 14 still have shoe tips 24, but the tapered magnets can also be retained via the taper alone without the shoe tips 24.

Figure 3:
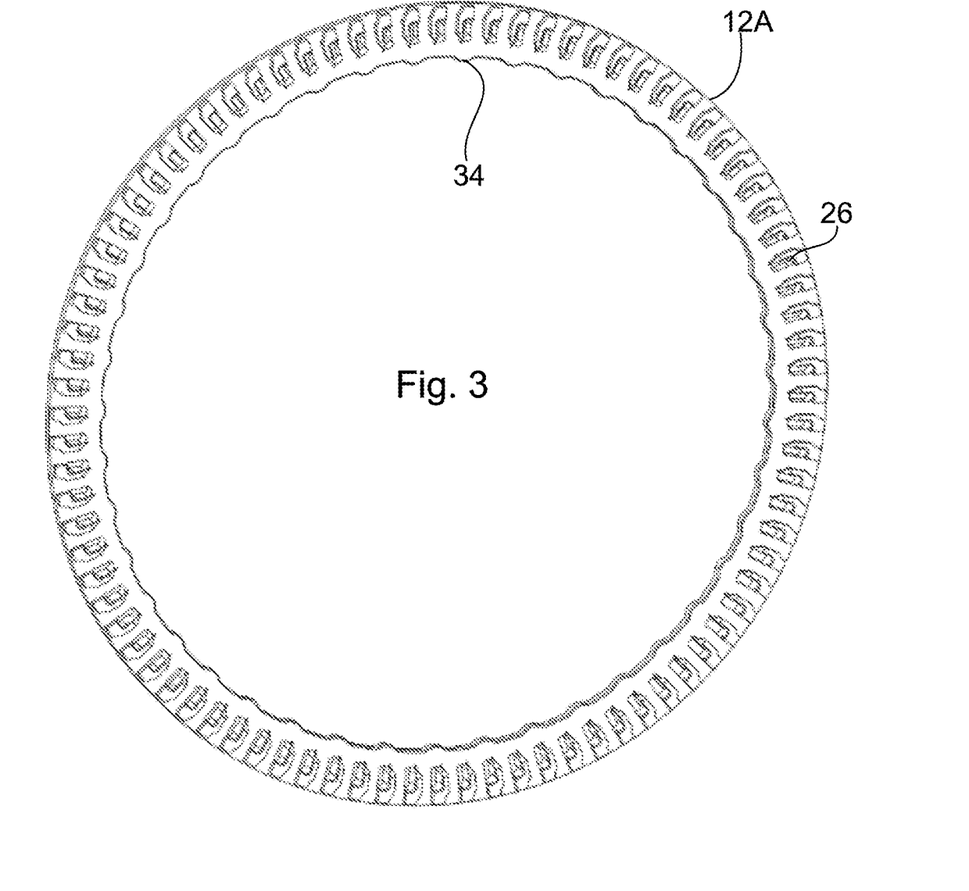
FIG. 3 shows a pole carrier ring for a rotor of an electric machine.
Figure 4:
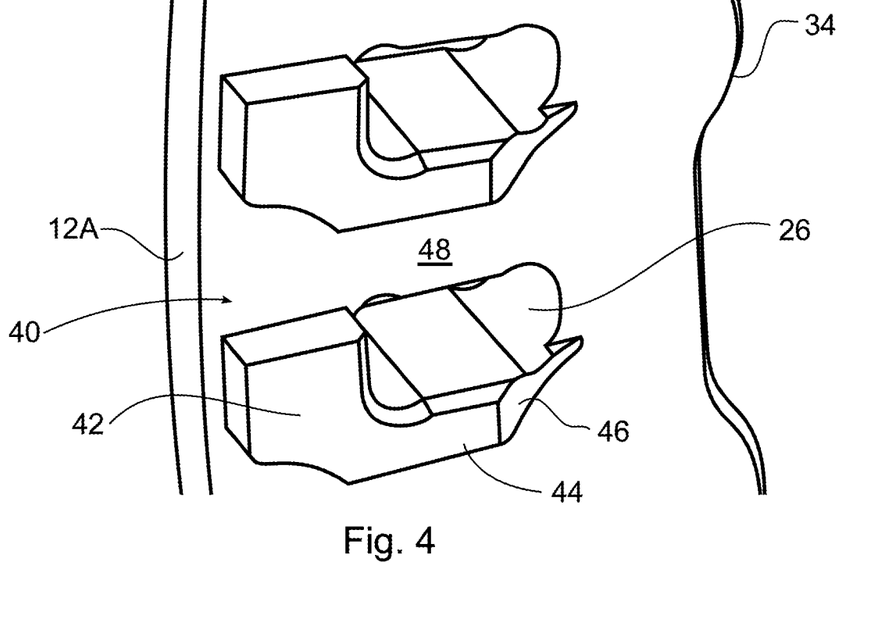
FIG. 4 shows a pole carrier ring slot and centering embossment for use with permanent magnets.

The pole carrier rings 12A and 12B may each be a flat circular ring with high precision rectangular receiving slots 26 which provide a clearance fit for the inserts or bosses 22 on the electromagnetic poles 14. The receiving slots 26 may be bounded on one or more sides of the slots 26 by centering embossments or profiles 40. The embossments 40 are raised portions of the rings 12A and 12B that have a flat top or other configuration that can abut against or mate with corresponding portions of the pole elements 14 and magnets 16. The bosses 22 insert into the slots 26 while the main bodies of the pole elements 14 abut or seat against a portion 42 of the embossments 40. When the magnets 16 are inserted between the rings 12A and 12B the magnets 16 seat or abut against a second portion 44 of the embossments 40. A ramp or chamfer 46 that declines in thickness in the radial inward direction assists in location of the magnets 16 on the embossments 40 and centering of the magnets 16. A gap 48 is provided between embossments 40 and this in combination with the raised profile of the embossments 40 allows air flow around the magnets 16 and pole elements 14. Various configurations of the embossments 40 may be used such as flat and extending around two sides of the slots 26 as shown. The pole carrier rings 12A and 12B may each have the same construction, as shown in FIGS. 3 and 4, and may be made of non-magnetic material, such as but not limited to aluminum to provide high magnetic resistance between adjacent north and south poles.

Figure 11:
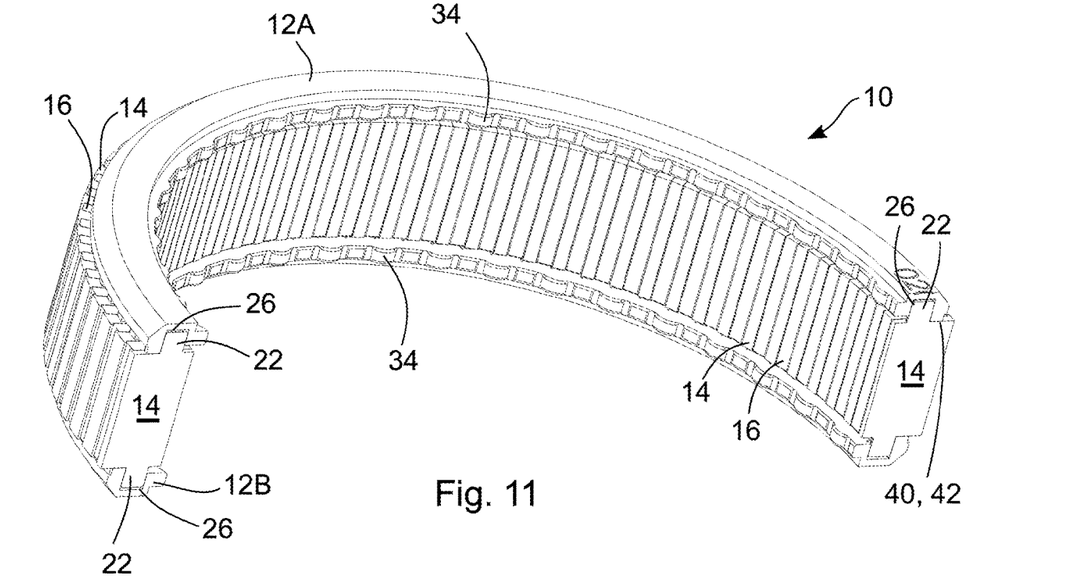
FIG. 11 is an isometric cutaway view of the assembly of FIG. 1 showing a cut through poles.
Figure 12:
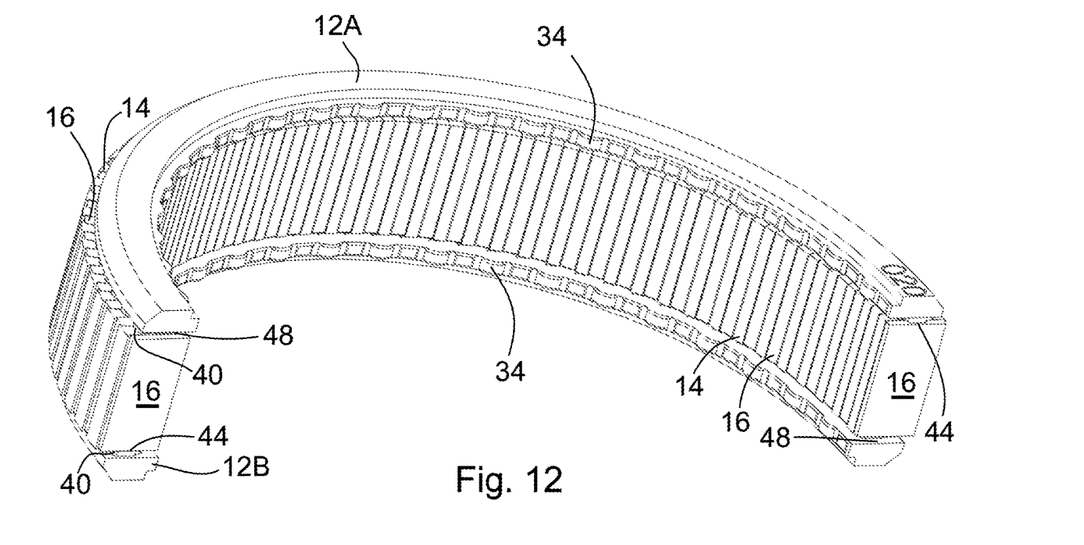
FIG. 12 is an isometric cutaway view of the assembly of FIG. 1 showing a cut through magnets.

FIGS. 11 and 12 show views cutting through poles 14 (FIG. 11) or through magnets 16 (FIG. 12). FIG. 11 shows bosses 22 of the poles 14 in receiving slots 26 of the pole carrier rings 12A and 12B. The portion 42 of the embossments 40, contacting the poles 14, is also cut through in this figure. In FIG. 12, the cut of the view is through magnets 16 and also through the gap 48 between embossments. The second portion 44 of the embossments 40, which abuts the magnets 16, can also be seen in FIG. 12.

Figure 10:
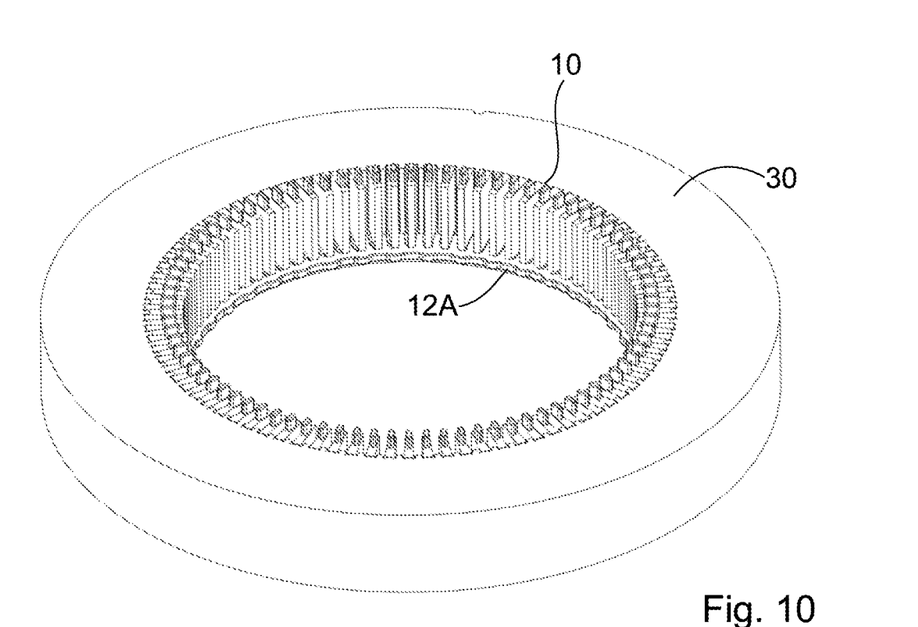
FIG. 10 shows rotor poles mounted to a pole carrier ring using an alignment ring (circular mold).

For assembling the radial multi piece rotor, a circular alignment ring or mold 30, shown in FIG. 10, is used and may be required to pre-install and align the poles 14 to the designed positions. The circular mold 30 can be made of aluminum. The circular mold inner diameter needs to be larger than the outer diameter of the pole carrier ring to allow it to be removed after completing the rotor assembly. The circular mold comprises of high precision slots 32 that are a negative profile of the pole shoe tips 24.

Figure 6:
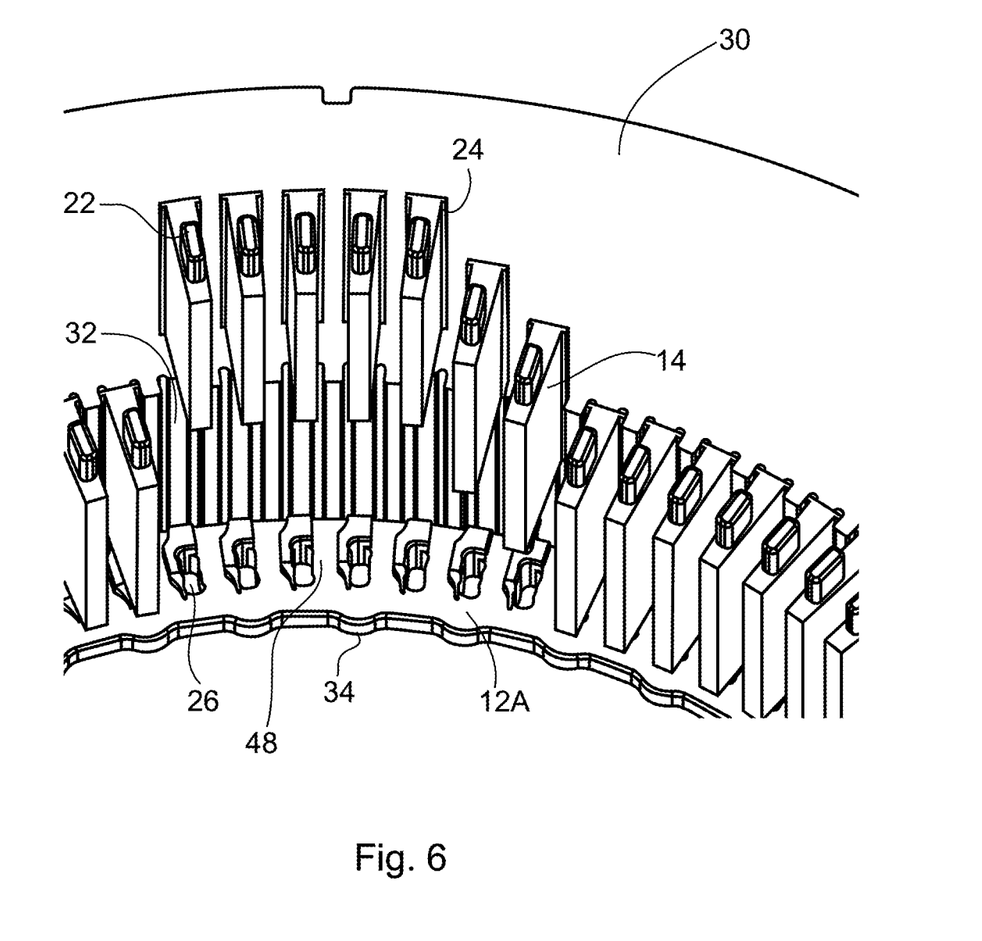
FIG. 6 shows installation of rotor poles using an alignment ring to provide axial and radial positioning.
Figure 7:
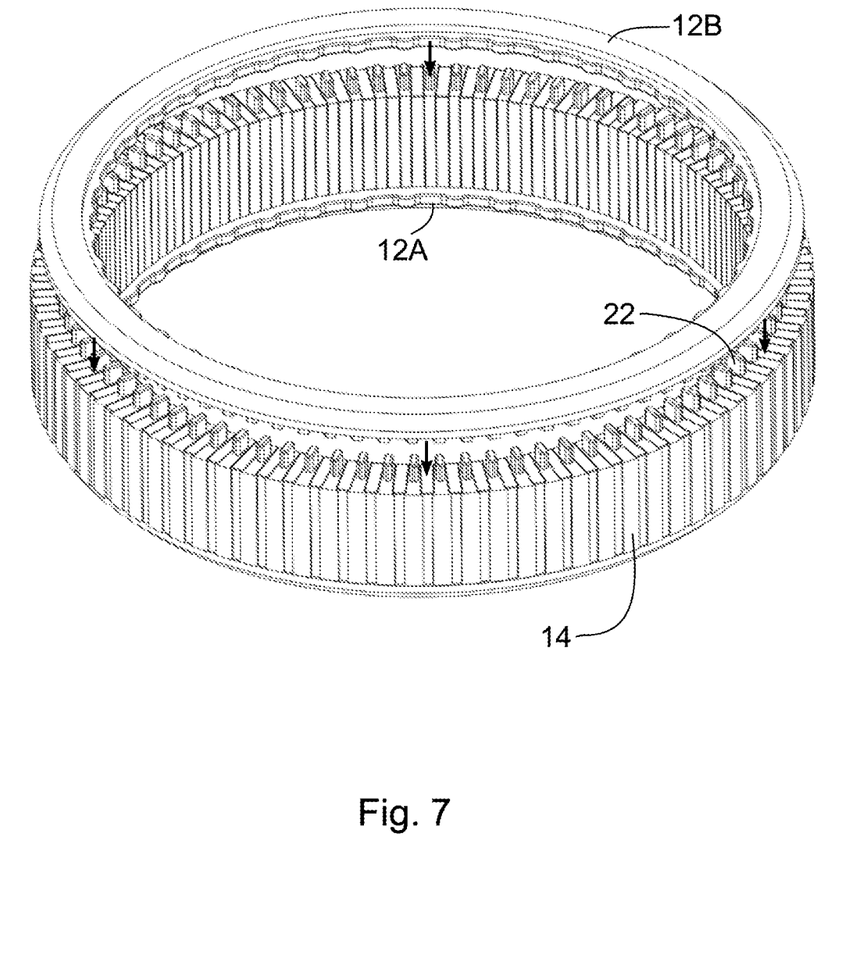
FIG. 7 shows assembly of pole carrier ring onto the magnet carrier inserts.

In the embodied rotor assembly, the rotor is designed to be rotated inside the stator. To assemble the radial multi piece rotor, the circular mold 30 is placed on a flat surface (FIG. 6). Pole elements 14 are then inserted into the slots 32 in the mold 30. This process positions all poles 14 to align the slots in one of the pole carrier rings 12A or 12B for example pole carrier ring 12A. One of the pole carrier rings 12A and 12B, for example pole carrier ring 12A, is placed onto all poles 14 to engage all pole inserts 22 at one end to the ring 12A. The whole setup is then flipped over and the other pole carrier ring 12B is also to be placed and engaged to all pole inserts 22 on the other end. Once all inserts 22 are engaged, a rotor core assembly is formed and the circular mold 30 is to be removed axially from the rotor core assembly.

The non-limiting exemplary rotor shown in the figures is for an external stator motor. Once the rotor core assembly is formed, permanent magnets 16 can be inserted to the slots between the pole elements 14 from the inner diameter of the assembly as shown in FIG. 8. FIG. 2 shows the complete rotor assembly. The magnets 16 are inserted after the steel poles 14 and outer rings 12A and 12B are assembled so the structure between the magnets 16 is complete. This eliminates the difficulty of assembling the structure with magnets in place, which would make alignment very difficult, especially because the permanent magnets are all repelling the adjacent magnets. For an external rotor motor, the magnet retention features would be inverted (inside-out compared to the exemplary embodiment shown here) and the magnets would be inserted from the outside after the poles and end rings are assembled.

The pole carrier rings 12A and 12B have locating features 34 around their ID's, as can be seen for example in FIGS. 1, 3 and 4. These features slide into receiving features in OD of the third ring 18. The third ring 18 and hub 36 are then secured to the poles 14 and pole carrier rings 12A and 12B with glue and/or axial clamp ring/s. The assembly, shown in FIG. 2, is now ready for assembly into an electric motor with a stator.

The invention claimed is:
1. A permanent magnet carrier comprising:
a first non-magnetic ring;
a second non-magnetic ring axially spaced from the first non-magnetic ring;
radially tapered soft magnetic pole elements, the soft magnetic pole elements each connecting to the first and second non-magnetic rings and the soft magnetic pole elements separated by the first and second non-magnetic rings; and
permanent magnets disposed between the soft magnetic pole elements,
wherein both ends of each of the soft magnetic pole elements are fitted in receiving slots in the first and second non-magnetic rings to engage the soft magnetic pole elements to the first and second non-magnetic rings.

2. The permanent magnet carrier of claim 1 in which the magnetic pole elements are shaped to restrain the magnets from motion in a radially outward direction.

3. The permanent magnet carrier of claim 2, in which the permanent magnets are radially tapered and the magnetic pole elements define slots between the magnetic pole elements shaped to accommodate the tapered permanent magnets.

4. The permanent magnet carrier of claim 1 in which the permanent magnet carrier further comprises a third nonmagnetic ring connected to the first and second non-magnetic rings and positioned radially inward of the magnets.

5. The permanent magnet carrier of claim 4, in which the third non-magnetic ring is a portion of a hub.

6. The permanent magnet carrier of claim 4, wherein the third non magnetic ring is secured to the soft magnetic pole elements with glue.

7. The permanent magnet carrier of claim 1, where the first non-magnetic ring and the second non-magnetic ring are metallic.

8. The permanent magnet carrier of claim 7, in which the first non-magnetic ring and the second non-magnetic ring are aluminium or titanium.

9. The permanent magnet carrier of claim 1, in which the receiving slots provide a clearance fit for receiving the ends of the soft magnetic pole elements.

10. The permanent magnet carrier of claim 1 in which the soft magnetic pole elements comprise bosses at both ends which are fitted in the receiving slots in the first and second non-magnetic rings.

11. The permanent magnet carrier of claim 1, wherein the receiving slots provide a clearance fit for receiving the bosses of the soft magnetic pole elements.

12. A rotor for an electromagnetic machine comprising the permanent magnet carrier of claim 1.

* * * * *